United States Patent [19]

Brazier

[11] Patent Number: 5,607,210

[45] Date of Patent: Mar. 4, 1997

[54] WHEEL MOUNT TRACK CONVERSION ASSEMBLY

[76] Inventor: Glen Brazier, 1436 Main Ave. N., Thief River Falls, Minn. 56701

[21] Appl. No.: 361,040

[22] Filed: Dec. 21, 1994

[51] Int. Cl.$^6$ ............................................. B62D 55/14
[52] U.S. Cl. .................... 305/131; 305/135; 305/154
[58] Field of Search .......................... 305/19, 15, 21, 305/22, 24, 29, 32, 56, 57, 35 R, 35 EB, 124, 125, 129–132, 134, 154, 111, 193, 195; 180/9.21, 9.26, 9.28; 280/689, 700

[56] References Cited

U.S. PATENT DOCUMENTS

| | | | |
|---|---|---|---|
| 3,510,174 | 5/1970 | Lamb | 305/27 |
| 3,860,080 | 1/1975 | Firstenberg | 180/9.2 R |
| 3,939,930 | 2/1976 | Firstenberg | 180/5 A |
| 4,097,057 | 6/1978 | Goodrich, Jr. et al. | 280/96.1 |
| 4,262,972 | 4/1981 | Falk | 305/35 R |
| 4,448,273 | 5/1984 | Barbieri | 180/9.21 |
| 4,953,919 | 9/1990 | Langford | 305/31 |
| 5,031,973 | 7/1991 | Gillet | 305/10 |
| 5,205,879 | 4/1993 | Seitze et al. | 152/209 R |
| 5,277,450 | 1/1994 | Henschen | 280/717 |
| 5,352,029 | 10/1994 | Nagorcka | 305/39 |

*Primary Examiner*—David M. Mitchell
*Assistant Examiner*—Jonathan J. Yun
*Attorney, Agent, or Firm*—D. L. Tschida

[57] ABSTRACT

A modular endless track assembly which bolts to the wheel of a wheeled vehicle (e.g. pickup truck or ATV). The assembly includes a wheel retainer plate, drive drum, track frame and plurality of idler wheels, track tension adjuster, and vehicle support bracket. The drive drum and idler wheels cooperate with lugs and channels at the track. The support bracket includes an anti-torque coupler mounted between the vehicle and track frame. The coupler centers the track to an equilibrium position and prevents over rotation. The mounting position of the coupler and mounting brackets is varied at the track frame to accommodate front and rear wheel track assemblies. A recurring, W-shaped groove pattern at the track cooperates with the idler wheels to self-clean the track and maintain controlled vehicle steering.

17 Claims, 8 Drawing Sheets

WHEEL MOUNT TRACK CONVERSION ASSEMBLY

BACKGROUND OF THE INVENTION

The present invention relates to motorized vehicles and, in particular, to a modular, endless drive track assembly for converting four-wheeled drive automotive vehicles to an all terrain vehicle (ATV) and permit travel over a wide range of off-road terrains.

Varieties of all-terrain vehicles have been developed that include endless tracks. Many assemblies are integrally constructed with a vehicle. Some accommodate after market or retrofit mounting to an existing vehicle. The latter assemblies most typically require modifying the vehicle drive train or chassis to some degree to accommodate the track assembly.

One known retrofit assembly permits the conversion of two wheel drive vans. The assembly includes a pair of skis which couple to the non-driven front wheels of a vehicle. Endless track assemblies mount to the rear, drive wheels, and extend substantially the entire length of the vehicle. The vehicle drive shaft is extended and a separate brake assembly is fitted to the drive shaft to assist control and power transfer.

The converted vans provide space for transporting cargo and passengers. The vans are commonly used to transport winter sports enthusiasts and equipment to remote, off-road sites for activities such as skiing, ice-fishing or the like.

U.S. Pat. Nos. 3,737,001; 4,448,273; and 5,240,084 disclose other track conversion assemblies. The assembly of the U.S. Pat. No. 4,448,273 patent bears a particular resemblance to the present invention. The assembly, however, does not provide an anti-torque suspension and includes a distinguishable track drive system wherein track drive teeth engage a gear and sprocket that is shielded by slide bearing surfaces.

In contrast to known assemblies, the present invention was developed to provide a modular track assembly that is adaptable to conventional automotive vehicles, e.g. pickup trucks, vans and wheeled ATV's, without requiring any adaptation of the vehicle or drive train to power or brake the assembly. The assembly is designed to be commutable with existing wheel, brake and vehicle steering systems. The assembly finds particular advantage with four-wheel drive pickup trucks and wheeled ATV's. The assembly may also be used with two-wheel drive vehicles, and in which instance the non-driven wheels may be fitted with skis or other supports compatible with the terrain.

SUMMARY OF THE INVENTION

It is accordingly a primary object of the invention to provide a modular, endless track assembly which mounts with little or no modification to conventional wheeled vehicles such as trucks, vans and ATV's.

It is a further object of the invention to provide a modular assembly which mounts to either the front or rear wheels of the vehicle and as necessary to either the vehicle frame and/or steering assembly.

It is a further object of the invention to provide an assembly having a self-cleaning drive drum which clears mud, snow and other foreign materials from the drive track during normal use.

It is a further object of the invention to provide an assembly including means for selectively controlling the track tension.

It is a further object of the invention to provide a track support framework having an anti-torque coupler or support collar secured intermediate a vehicle mounting bracket and the track frame to resiliently center the frame to an equilibrium position and prevent over rotation of the frame as the frame moves over undulating terrain.

It is a further object of the invention to provide an endless, belted track wherein a seriatim, W-shaped groove pattern is provided in a terrain contacting surface of the track.

It is a further object of the invention to vibrate the track with idler wheels aligned to traction lugs.

Various of the foregoing objects, advantages and distinctions of the invention are obtained in a presently preferred, modular, track conversion assembly. The assembly includes a squirrel-cage shaped, drive drum. The drum spans the width of a belted track and engages transverse, raised drive lugs at the inner surface of the track. A retainer plate at the drive drum mounts to the backing plate of a vehicle wheel. Voids in the retainer plate and drive drum facilitate self-cleaning of the drive interface to the vehicle with normal drum and track rotation.

A track support frame depends from a stub axle which projects from the retainer plate and drive drum. The track frame includes a number of idler wheels that extend to opposite sides of the track frame. A pair of forward idler wheels mount to adjustable pillow block assemblies which selectively permit adjustment of the track tension. The idler wheels align to gaps or channels between the drive lugs on an inner track surface.

The drive drum, track frame and idler wheels are arranged to provide a triangular configuration, when viewed in side profile. The assembly is sized to mount within the wheel well of the vehicle without contacting the vehicle as the assembly traverses the terrain.

The track support frame includes at least one anti-torque support coupler at a vehicle support bracket. The coupler counterbalances the track frame and prevents over rotation and undue vertical motion of the track frame relative to encountered undulations in the terrain. The anti-torque support includes a vehicle mounted framing member having a rectangular end shaft which is adapted to rotate within a concentric collar. Multiple resilient shims at the collar mount between the collar and end shaft. Rotational movement of the end shaft is countered by compression of the resilient shims. Track frame rotation is thereby limited and resiliently opposed to prevent the frame from contacting the vehicle and to maintain the track assembly in centered equilibrium relative to the vehicle.

The terrain contacting surface of the belted track is formed to include a grooved pattern which recurs in a space comparable to the region of tangential track contact with each idler wheel. The pattern defines a W-shape which is centered to the longitudinal center of the track. Lateral vertices align to interior channels at the gaps between lugs defined in the track. The positioning of the idler wheels and lugs facilitates track cleaning.

Still other objects, advantages, and distinctions of the invention are described in further detail at the following description and with respect to the appended drawings. To the extent various modifications and improvements have been considered, they are described as appropriate. The description should not be literally construed in limitation of the invention. Rather, the invention should be interpreted within the spirit and scope of the appended claims.

DESCRIPTION OF THE PREFERRED EMBODIMENT

Figure 1:
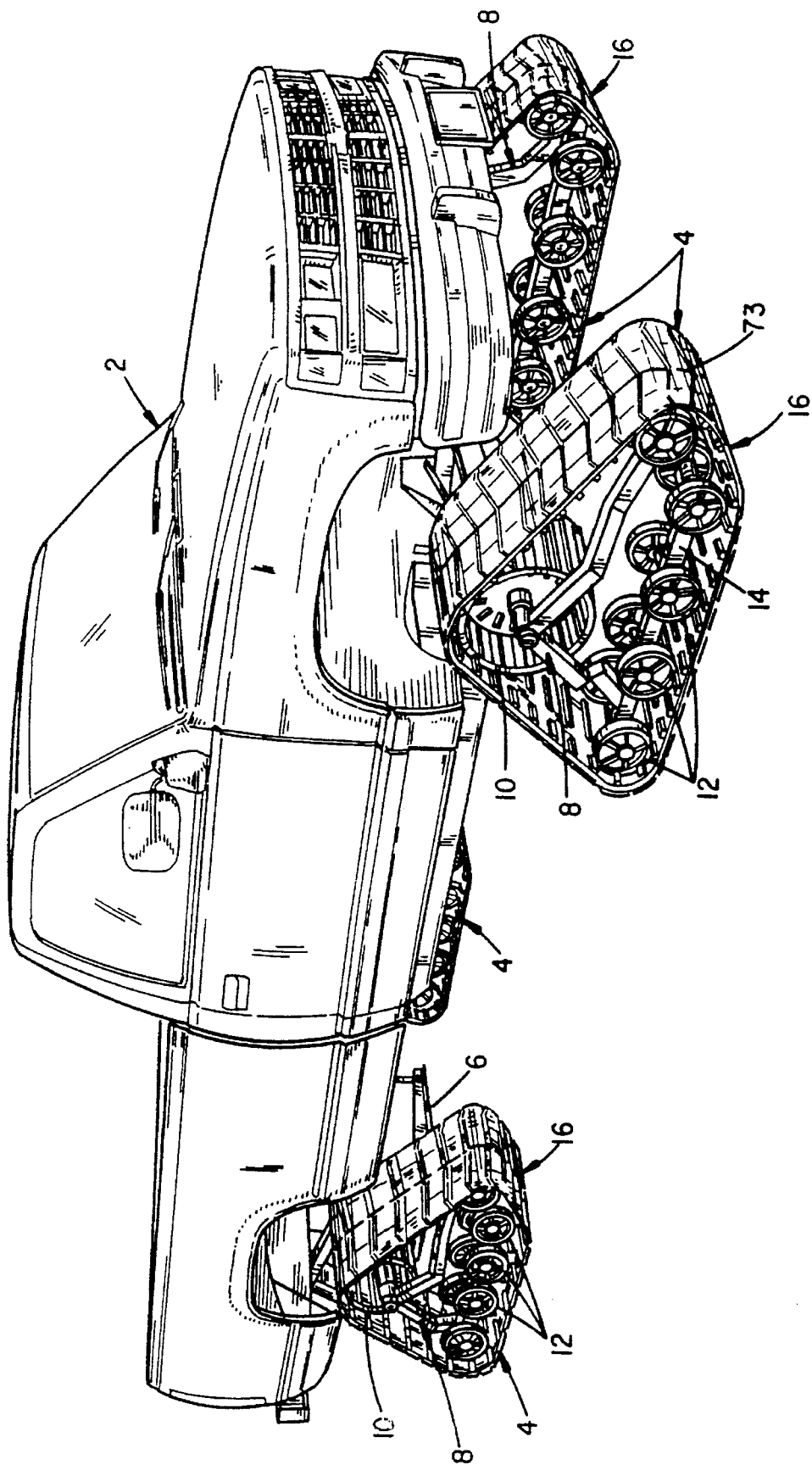
FIG. 1 is a perspective drawing of a four-wheel drive vehicle converted over to include multiple modular track assemblies of the invention.

Referring to FIG. 1, a perspective drawing is shown of a conventional four-wheel drive pickup truck 2. Separate endless track assemblies 4 of the invention are supported at the lug bolts (not shown) which extend from each wheel of the vehicle 2. The lug bolts project either from an available backing plate and brake drum or from a rotor, depending whether drum or disc brakes are provided.

A support bracket 6 extends from a track support frame 8 at each assembly 4 and is secured to the vehicle. The support bracket 6 of the rear track assemblies 4 are each secured to the vehicle frame, see also FIG. 3. The support bracket 6 is typically retained to a primary frame member of the vehicle 2, although could be supported to a shackle bolt or other essentially stationary portion of the vehicle chassis, versus the axle. Although a single support bracket 6 is shown, it is to be appreciated multiple brackets 6 might be used at each assembly 4. For example, the brackets 6 might extend from both the fore and aft ends of the assembly 4.

Figure 5:
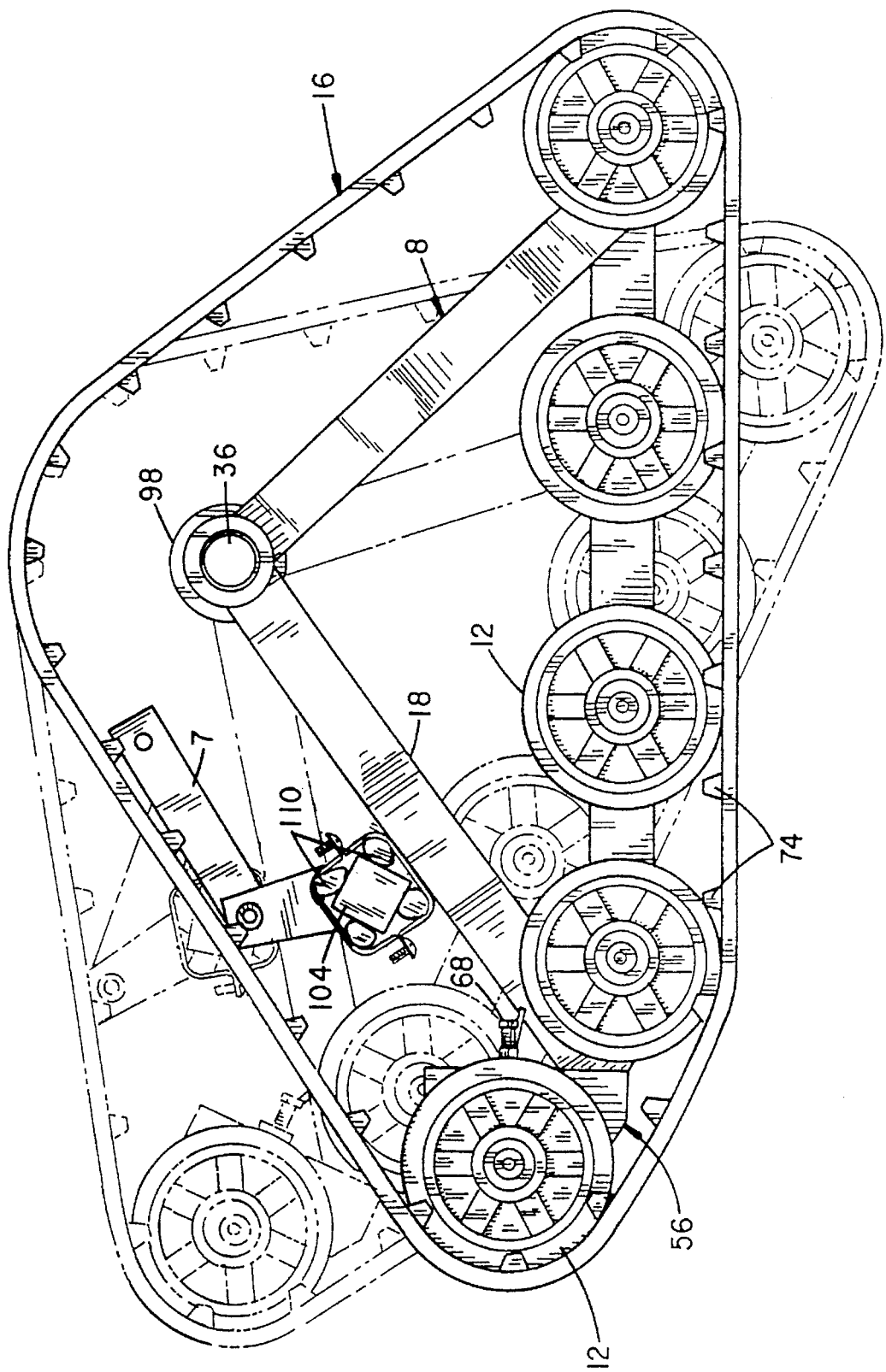
FIG. 5 is an elevation drawing shown in solid and dashed line to the rotation limiting counter movement provided at the anti-torque support coupler for a front wheel, tie rod end mounting.
Figure 6:
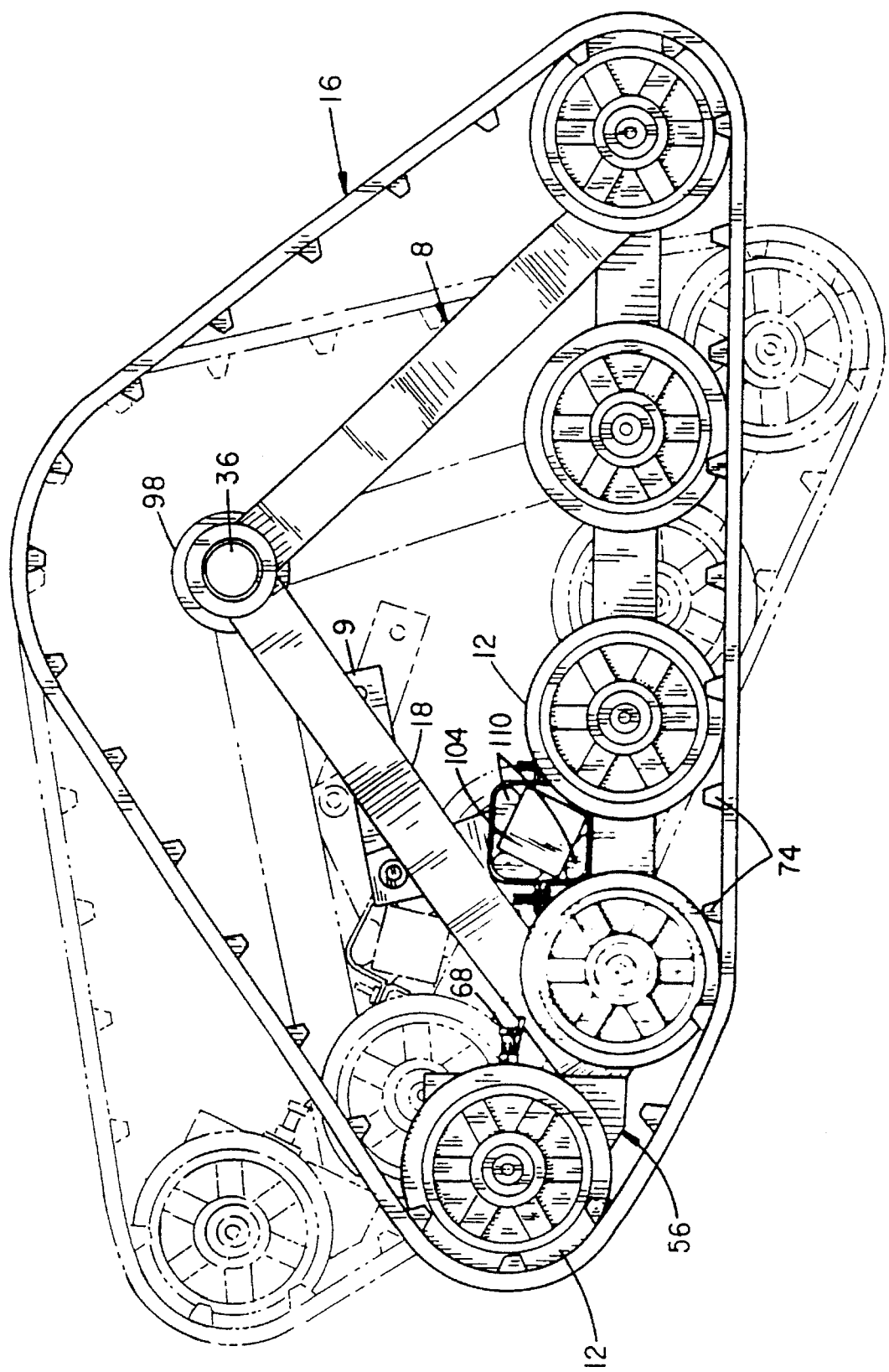
FIG. 6 is an elevation drawing shown in solid and dashed line to the rotation limiting counter movement provided at the anti-torque support coupler for a front wheel, ball joint mounting.
Figure 7:
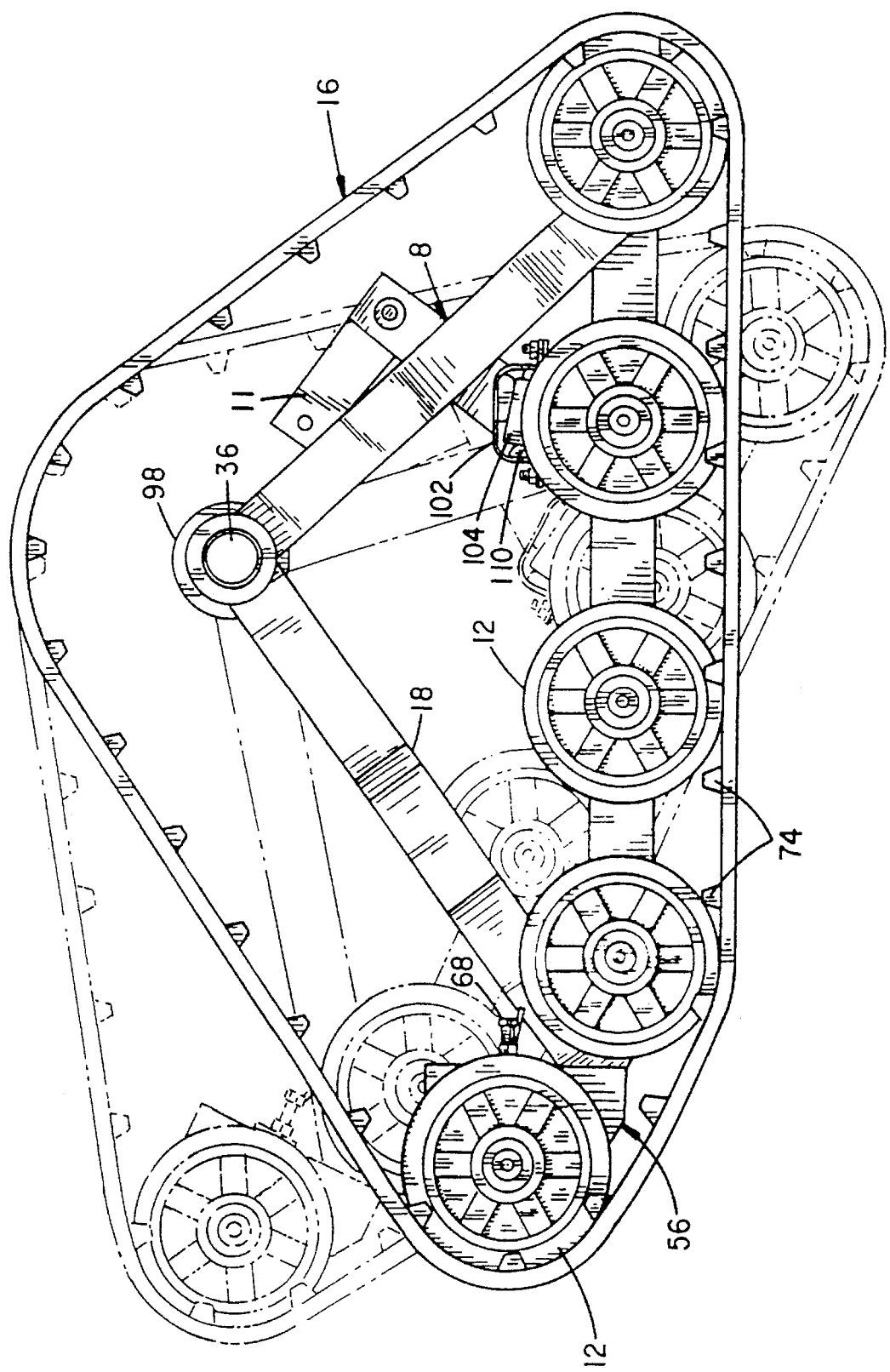
FIG. 7 is an elevation drawing shown in solid and dashed line to the rotation limiting counter movement provided at the anti-torque support coupler for a front wheel, brake caliper mounting.

The support bracket 6 of the front track assemblies 4 are respectively secured to the vehicle's right and left steering assemblies. For example, the front support brackets 6 can be secured to a tie rod end, drag link, A-frame, ball joint or brake caliper at the front wheels, such as depicted at FIGS. 5, 6 and 7. The related brackets 7, 9 and 11 of the front wheel track assembly 4 are correspondingly formed to fit the specific steering mount and may include one or more framing pieces and joints. The brackets 6, 7, 9 and 11 are constructed and mounted to the assembly 4 so as not to impede or interfere with vehicle steering.

Power is applied to each of the assemblies 4 via the available drive train. For a four-wheel drive vehicle, power is independently provided to each track assembly 4. For a two-wheel drive vehicle, power is typically applied only to the rear track assemblies 4. In such instance, the front track assemblies 4 merely facilitate steering. In lieu of including an assembly 4 at each of the front wheels, skis or other terrain engaging supports might be secured to the non-drive wheels. However, the depicted assemblies 4 are compatible with essentially all ground conditions, whether the terrain is sand, mud, bog or muskeg, snow or ice.

Conversion of the vehicle 2 simply entails removing each of the vehicle tires and attaching a track assembly 4 to the lug bolts. Once attached, the converted vehicle 2 is able to traverse a variety of normally impassable terrain. The tracks are particularly adapted for travel over snow and soft or muddy ground conditions. The assemblies 4 also permit travel over stream beds or other water-covered terrain for limited periods of operation. Preferably any traversed water should not be deeper than the top of the engine or the engine compartment should be sealed with appropriate shrouds. If the depth is greater than the door panels, modifications can be made to the door seals to prevent leakage.

The track assemblies 4 are presently constructed in a triangular configuration to an approximate length of 36 inches, a width of 16 inches and a height of 30 inches. A drive drum 10 is provided near the top or apex of each assembly 4. Multiple idler wheels 12 extend along opposite sides of a longitudinal frame member 14 and support a belted track 16. The belted, track 16 circumscribes the drive drum 10 and idler wheels 12. When fitted to a typical 15 inch wheel pickup truck, the assemblies 4 provide an additional 6 to 10 inches of ground clearance, beyond a normal vehicle ground clearance of 16 to 19 inches.

Figure 2:
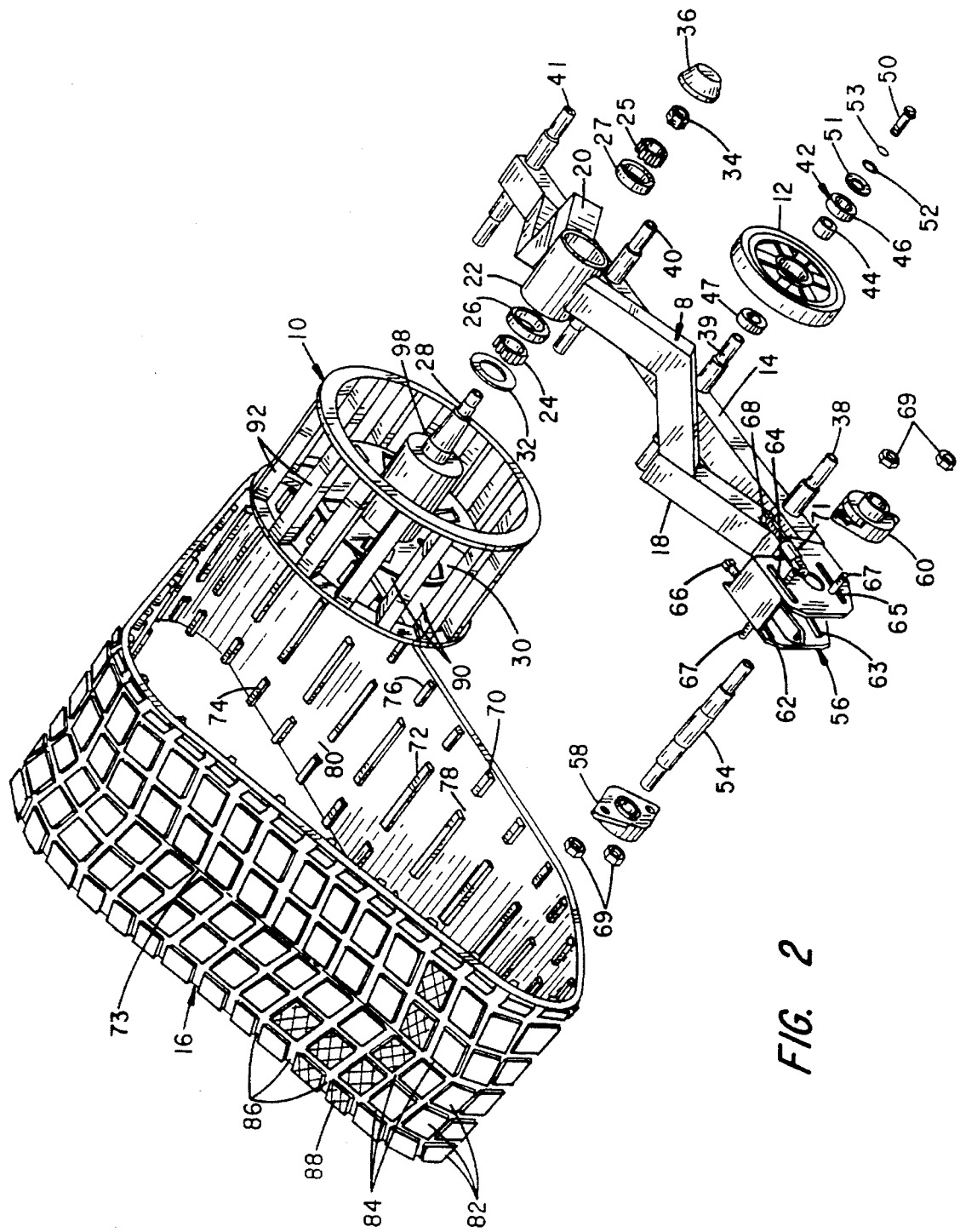
FIG. 2 is a perspective drawing shown in exploded assembly of a partial track assembly.
Figure 3:
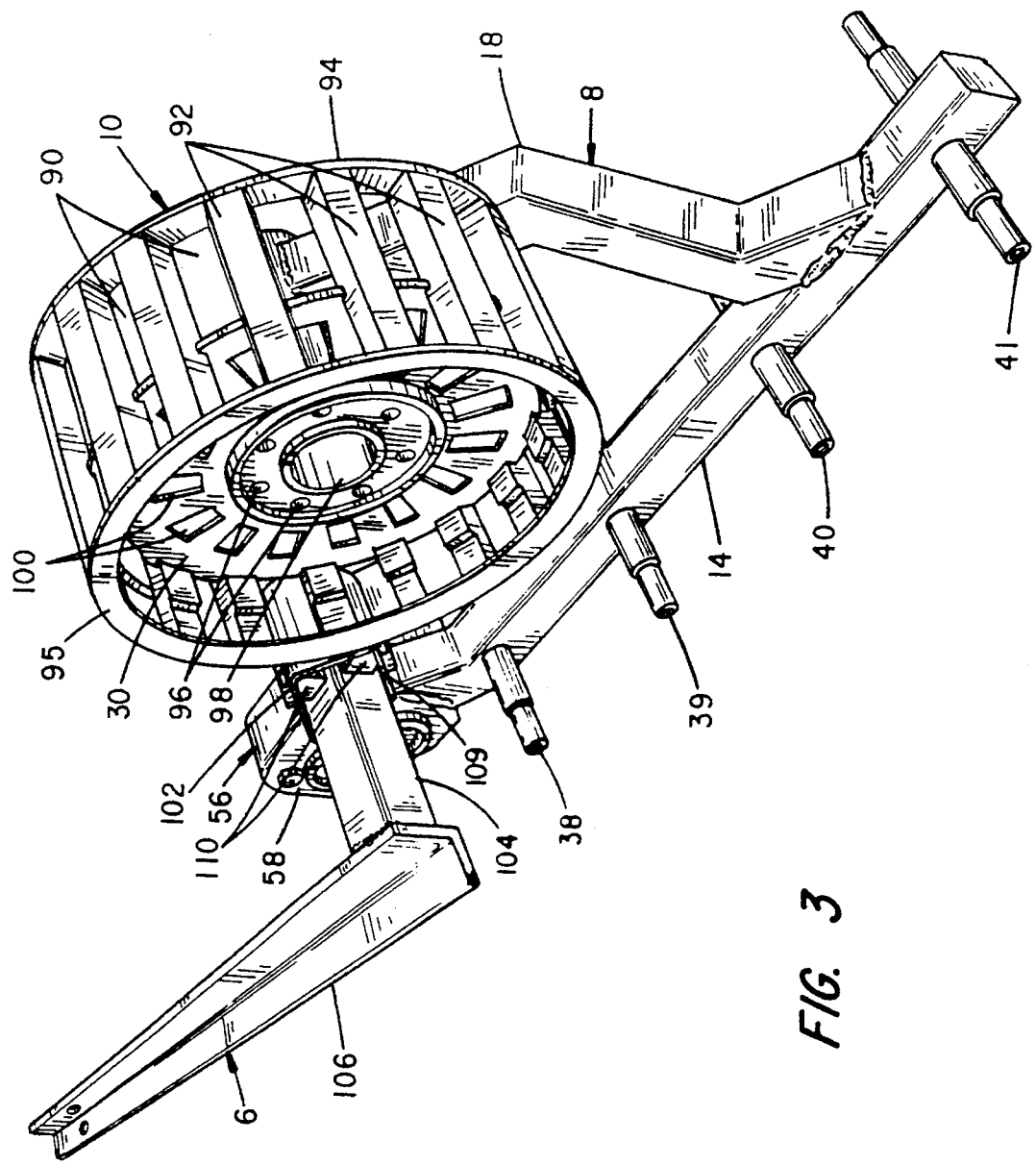
FIG. 3 is a perspective drawing from the inside of a front wheel track assembly.
Figure 8:
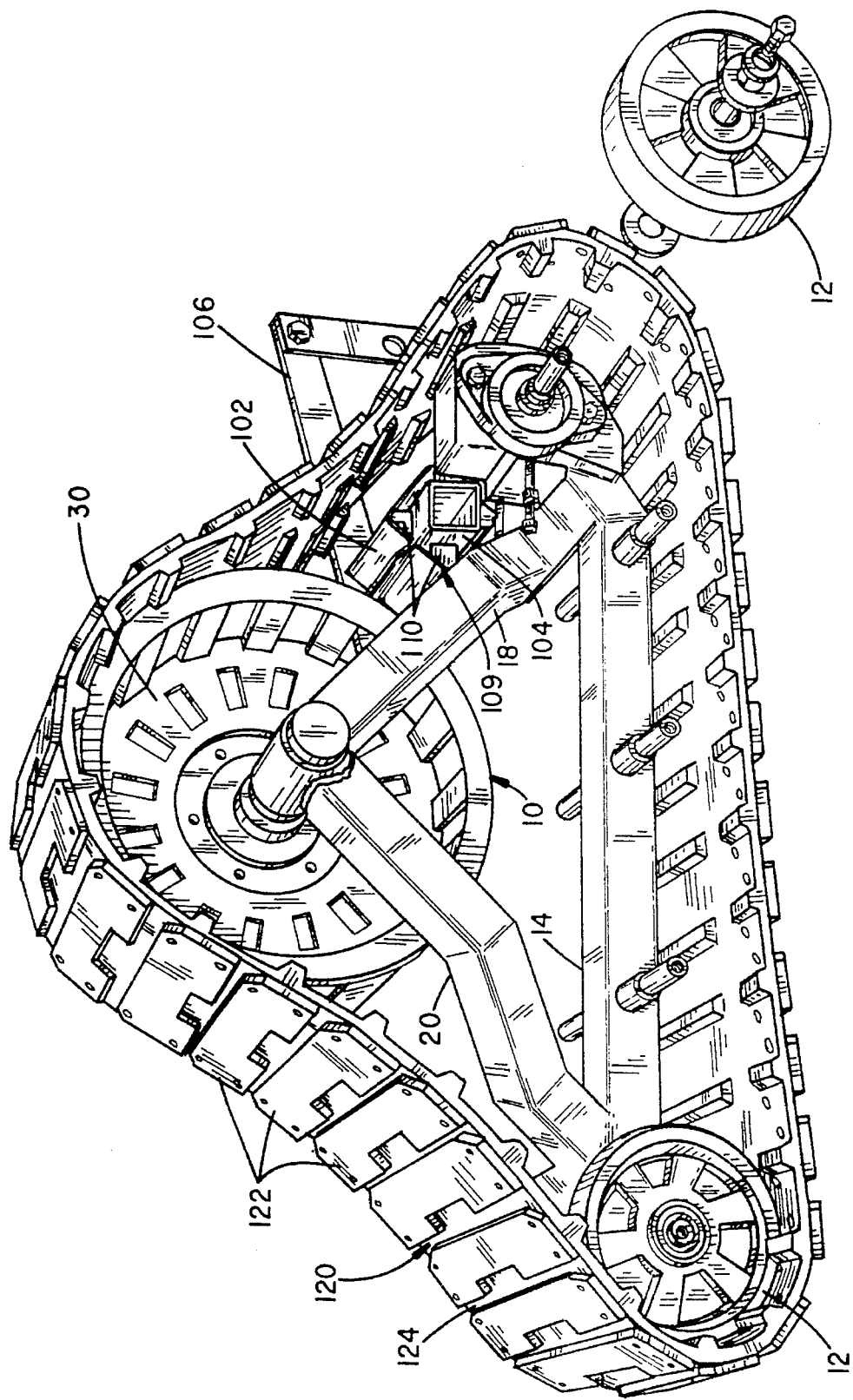
FIG. 8 is a perspective drawing, shown in partial disassembly, of a track assembly including an alternative belted track.

FIGS. 2, 3 and 8 depict details to the particular construction of each track assembly 4 at the inner and outer sides. FIG. 2 shows a partial exploded assembly from the outside (i.e. looking toward the vehicle 2) and FIG. 3 shows a view from the inside (i.e. looking out from beneath the vehicle 2). FIG. 8 shows a partial exploded assembly drawing from the outside of an alternative track assembly 4 and wherein a cleated track is provided.

With attention to FIG. 2 and the track frame 8, the frame 8 is configured in a triangular arrangement that includes the longitudinal member 14 and a pair of frame members 18 and 20. The members 18 and 20 project inward and upward at approximately 60 degrees to an approximate midpoint of the member 14 and a support collar 22. The members 14, 18 and 20 are constructed of 2 ½ inch square steel tube stock. A variety of other suitable framing materials may be used, provided the frame 8 is able to withstand the normally encountered forces. The geometric configuration of the frame 8 can also be modified, provided a convenient, durable mounting is obtained to the vehicle and sufficient ground contact is obtained at the track.

The collar 22 contains a pair of bearings 24, 25 and races 26, 27. A stub axle 28 projects from a wheel retainer plate 30 of the drive drum 10 and mounts through the housing 22. A seal 32 and nut 34 retain the track frame 8 to the axle 28 and are covered with a dust cover 36. The axle 28 is sized to accommodate the vehicle and anticipated use.

Multiple stub axles 38, 39, 40 and 41 project from each side of the longitudinal frame member 14. Each axle 38–41 supports one of the idler wheels 12 at a provided bearing set 42. Each set 42 includes a center bushing 44 and bearings 46 and 47. A bolt 48 and washers 51–53 retain each idler wheel 12 to an end of the axles 38–41.

An additional stub axle 54 is supported to a track tensioner 56 that projects at a forward end of the track frame 8. The tensioner 56 includes a pair of adjustable pillow blocks or pillow bearings 58 and 60. The bearings 58, 60 are retained to the tensioner 56 with bolt and nut fasteners 67, 69 at provided pairs of slots 62, 63 and 64, 65.

The relative extension of the axle 54 and forward idler wheels 12 to the frame 8 is determined with a pair of threaded adjusters 66 and 68. The adjusters 66, 68 mount to captured nuts 71 at the tensioner 56 and cooperate with the bearings 58, 60 to extend and retract the bearings. The slots 62–65 allow sufficient longitudinal free play at the pillow bearings 58, 60 to adequately tension the track 16 to retain the track 16 to the frame 8 and, as necessary, permit removal of the track 16.

The idler wheels 12 are approximately 6 inches in diameter, 1½ inches wide and include a rubberized outer surface. The wheels 12 are presently constructed of an ultra high molecular weight plastic core that is covered with a rubber cover. A variety of wheels can be used, provided the wheels are durable and compatible to the anticipated conditions and environment.

The track 16 is constructed in a continuous loop from laminated rubber belting. The track 16 is approximately ¾ inches thick and 12 feet long. Fiber and/or metal cording laminates may also be used. Presently, a center longitudinal rubber core is covered with multiple belted laminates of ARROWMAX fibers set in rubber. The fibers are transversely aligned in each of a number of alternating layers.

Sets of drive lugs 70 project in rows from an inner surface of the track 16 transverse to a longitudinal center line 73. Three lugs are included at each row. A center lug 72, which is the widest, meshes with the drive drum 10. A pair of lugs 74, 76 are displaced to the lateral sides of the center lug 72 by a pair of intervening gaps 78, 80 which align with the edges of the idler wheels 12. Collectively, the gaps 78, 80 define longitudinal channels that support the idler wheels 12 between the lugs 72, 74 and 72, 76 and retain the track 16 to the frame 8.

The terrain contacting surface of the track 16 also provides a series of raised lugs 82. The lugs 82 extend laterally in a "W" shaped pattern that repeats approximately every 3 inches, which is the approximate length of the tangential contact region of each idler wheel 12 with the track 16. The lugs 82 are defined by transverse grooves 84 and 86 that extend longitudinally and laterally over the outer surface. The lugs 82 project approximately ½ to ¾ inch above the grooves 84, 86. Each lug 82 includes crisscrossed cuts 88 in an outermost surface. The patterned W shape, grooves 84, 86 and cuts 88 collectively facilitate traction, yet permit the track 16 to self-clean.

Self cleaning is principally effected at the second column of longitudinal lugs 82 displaced outboard from the longitudinal center 73. These lugs 82 overly the channels defined by the gaps 78, 80 and are continuously vibrated with idler wheel movement. The vibration is also transferred across the track 16 and tends to loosen debris which collects in the grooves 84, 86.

The drive drum 10 is mounted to cooperate with the lugs 72 in the fashion of a geared sprocket, reference FIG. 3. The drive drum 10 is constructed to span the lugs 72 and exhibits a 16 inch diameter. A series of rectangular apertures 90 in the outer periphery of the drum 10 cooperate with the lugs 72 to drive the track 16. Each aperture 90 provides an opening of approximately 2 by 8 inches, which accommodates the lugs 72 and some free space.

The apertures 90 are defined between a series of tubes 92 that extend between a pair of flat annular ring or end plates 94, 95. The retainer plate 30 is welded to each of the tubes 92 and is recessed a depth sufficient to permit clearance between the drum 10 and the brake assembly (not shown) of the vehicle.

A series of mounting holes 96 at the retainer plate 30 mount to the wheel lug bolts and surround a hub or housing 98 that supports the stub axle 28. A series of concentric voids 100 extend between the hub 98 and tubes 92 to facilitate self-cleaning of debris, which might collect at the drum 10 during normal operation. The diameter of the housing 98 is also sized to mount over the hub of the vehicle wheel.

Welded at the inner surface of the frame member 18 is a tubular collar 102. An offset end shaft 104 of the vehicle support bracket 6 mounts within the collar 102. The end shaft 104 is welded to a bracket member 106 which mounts to the vehicle. The end shaft 104 is constructed of square tube stock and is aligned to a bore 109 of the collar 102. A number of resilient, compressible shims 110 are fitted to the bore 109. Resilient surfaces of the shims 110 adjacent the end shaft 104 form a square bore and mate with the flat surfaces of the end shaft 104. The shims are fitted such that they are not able to rotate in the bore 109.

Figure 4:
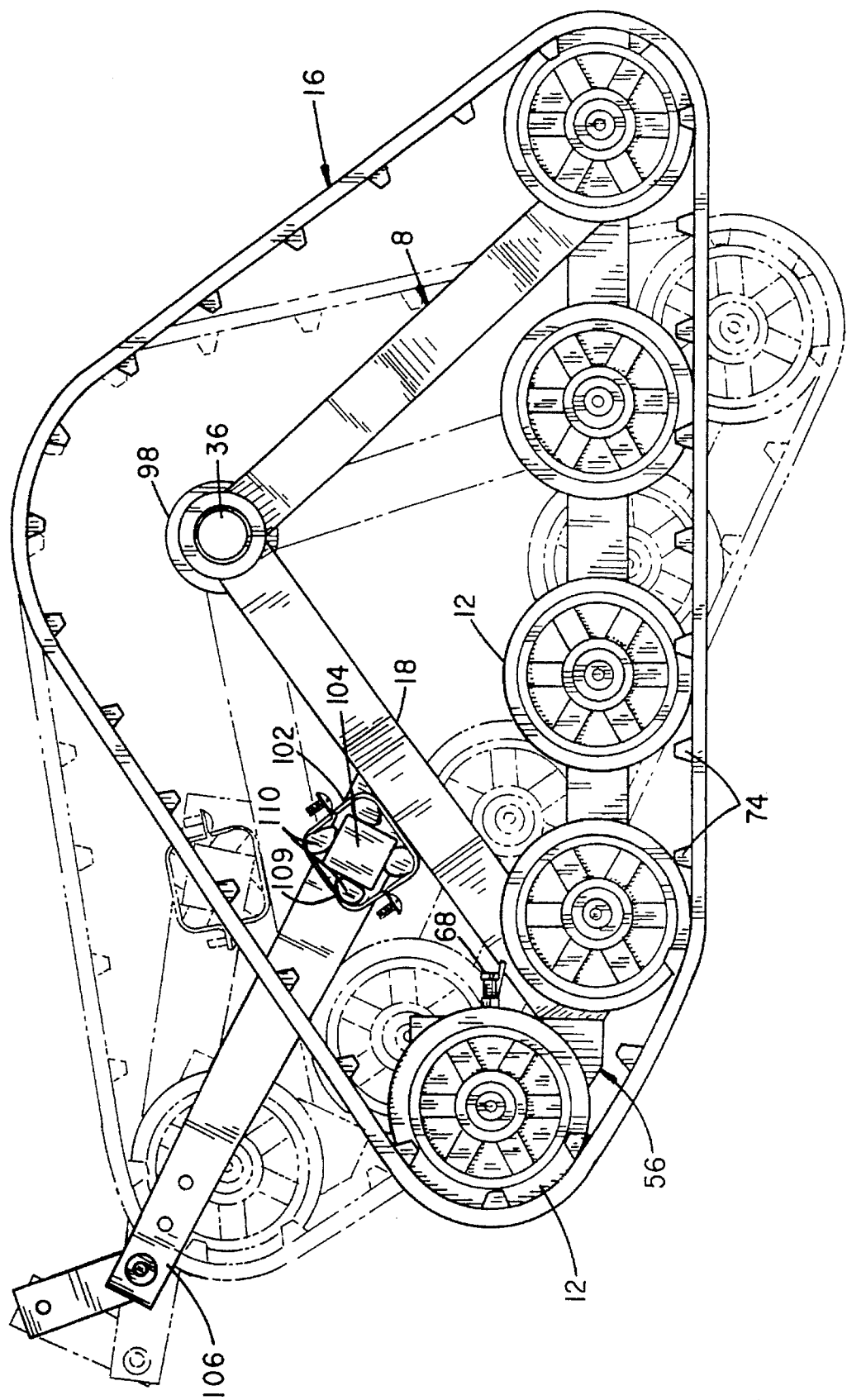
FIG. 4 is an elevation drawing shown in solid and dashed line to the rotation limiting counter movement provided at the anti-torque support coupler for a rear wheel mounting.

The shaft 104 cooperates with the shims 110 to counterbalance rotational and vertical movement of the track frame 8. The anti-torque suspension particularly prevents contact between each assembly 4 and the vehicle 2, as each assembly 4 responds to the terrain. That is, as the frame 8 rises and falls with undulations in the terrain, the shaft 104 rotates within the collar 102 between two extreme positions. The rotated condition is shown in dashed line at FIG. 4. The shims 110, in turn, compress to resist the rotation and induce the frame 8 to the equilibrium position, which is shown in solid line at FIG. 4.

Preferably the end shaft 104 is mounted to rotate only between two opposite limits, for example, plus or minus 45 degrees, as established by the collar 102. Over rotation of the assembly 4 is thereby prevented and an independent, dynamic, anti-torque suspension is thus obtained at each assembly 4.

Although one particular anti-torque coupler has been shown, it is to be appreciated varieties of other couplers having captured cooperating eccentric end shafts and mating resilient surfaces can be used to equal advantage. Similarly, more than one coupler 102 can be used to retain each assembly 4 to the vehicle 2.

FIGS. 5, 6 and 7 depict alternative mountings of the track assembly 4 as configured to respectively mount to front steering assemblies at the tie rod end, ball joint and brake caliper of various vehicles. The equilibrium and rotated conditions of the assemblies 4 are shown in solid and dashed line. Depending upon the vehicle mounting, the position of the coupler 102 is varied at the frame members 14, 18 and 20. Appropriate bends or multiple bracket pieces are provided at the brackets 7, 9, and 11 to accommodate the mounting.

FIG. 8 shows a track assembly 4 which supports an alternative belted track 120. The principal difference of the track 120 versus the track 16 is that lugs 122 are separately fastened to a flat belt surface 124. The lugs 122 are attached with rivets or other suitable fasteners. Although a smooth tread surface is shown, the lugs 122 may be constructed to a variety of configurations and may include appropriate surface texturing at the surface 124 to accommodate a variety of terrain.

While the invention has been described with respect to its presently preferred construction and various considered modifications and improvements, still other equivalent embodiments may be suggested to those skilled in the art.

The following appended claims should be interpreted to include all equivalent embodiments within the scope thereof.

What is claimed is:

1. An all-terrain track assembly comprising:
   a) a track framework including a plurality of idler wheels and a drive drum;
   b) a drive track trained about said idler wheels and said drive drum and having a first plurality of raised lugs which mesh with apertures at said drive drum and second and third pluralities of raised lugs laterally displaced from the first lugs to define first and second channels which align with said idler wheels;
   c) tensioner means for adjusting the tension of said drive track at said framework; and
   d) anti-torque means adapted to be attached to a vehicle for biasing said framework to an equilibrium position between first and second limits and comprising a frame member which mounts to said vehicle and a collar having a bore which includes means having a plurality of resilient surfaces that mate to said frame member to resist rotation of said frame member within said bore.

2. Apparatus as set forth in claim 1 wherein said collar includes a plurality of compressible shims and which shims are arranged to define a bore complementary to said frame member.

3. Apparatus as set forth in claim 2 wherein said collar includes a plurality of compressible shims arranged to define a rectangular bore which receives said frame member.

4. Apparatus as set forth in claim 2 wherein said idler wheels and said drive drum are arranged to said framework to exhibit a substantially triangular shape when viewed in side profile.

5. Apparatus as set forth in claim 1 wherein the tensioner means comprises bearing means for supporting a stub axle containing one of said idler wheels and wherein said framework includes means for axially adjusting the position of said one idler wheel at said framework comprising a plurality of pillow blocks which support one of a plurality of stub axles, wherein the one stub axle supports at least one of said idler wheels, and wherein said framework includes means for axially adjusting the extension of said pillow blocks along said framework.

6. Apparatus as set forth in claim 1 wherein said drive drum comprises a plurality of members which extend between first and second annular rings, which rings are mounted transverse to a terrain contacting surface of the drive track and which members are separated from one another to define said apertures, a plate mounted to said plurality of members and including a plurality of mounting holes and a stub axle, and wherein said framework includes a bearing means for receiving said stub axle.

7. Apparatus as set forth in claim 1 wherein said drive track comprises a rubber core and to which a plurality of belted layers are laminated and wherein a terrain contacting surface of said drive track includes a seriatim repeating tread pattern exhibiting a W-shape.

8. Apparatus as set forth in claim 17 wherein each tread pattern is a defined by a plurality of raised lugs and intervening crisscrossed grooves formed into said belted layers and wherein said lugs further include crisscrossed grooves in a raised surface.

9. Apparatus as set forth in claim 1 wherein a terrain contacting surface of said drive track includes a seriatim repeating tread pattern having a W-shape defined by a plurality of raised lugs and intervening crisscrossed grooves formed into said belted layers and wherein said lugs further include crisscrossed grooves in a raised surface.

10. An all-terrain track assembly comprising:
    a) a track framework including a plurality of idler wheels and a drive drum comprising a plurality of members which extend between first and second annular rings and which members are separated from one another to define said apertures, a plate mounted to said plurality of members and including a plurality of mounting holes and a stub axle, and wherein said framework includes a bearing means for receiving said stub axle;
    b) a drive track trained about said idler wheels and said drive drum and having a first plurality of raised lugs which mesh with the apertures at said drive drum and second and third pluralities of raised lugs displaced from the first lugs to define first and second channels which align with said idler wheels; and
    c) anti-torque means adapted to be attached to a vehicle for biasing said framework to an equilibrium position between first and second limits and comprising a frame member which mounts to said vehicle and a collar having a bore which includes compression means having a resilient surface that mates to said frame member to resist rotation of said frame member within said bore.

11. Apparatus as set forth in claim 10 wherein said collar includes a plurality of compressible shims and which shims are arranged to define a bore complementary to said frame member.

12. Apparatus as set forth in claim 10 wherein said collar includes a plurality of compressible shims arranged to define a rectangular bore which receives said frame member.

13. An all-terrain track assembly comprising:
    a) a track framework including a plurality of idler wheels and a drive drum comprising a plurality of members which extend between first and second annular plates are displaced apart to define a plurality of apertures, a plate including a plurality of mounting holes and a stub axle, and wherein said framework includes a bearing means for receiving said stub axle;
    b) a drive track trained about said idler wheels and said drive drum and having a first plurality of raised lugs which mesh with said apertures at said drive drum and second and third pluralities of raised lugs laterally displaced from the first lugs to define first and second channels which align with said idler wheels;
    c) tensioner means for adjusting the tension of said track at said framework; and
    d) anti-torque means adapted to be attached to a vehicle for biasing said framework to an equilibrium position and comprising an eccentric frame member which mounts to said vehicle and a collar having a bore which includes a plurality of compressible shims arranged to provide a bore which receives said eccentric frame member to resist rotation of said eccentric frame member within said bore.

14. Apparatus as set forth in claim 13 wherein a terrain contacting surface of said drive track includes a seriatim repeating tread pattern having a W-shape defined by a plurality of raised lugs and intervening crisscrossed grooves formed into said belted layers and wherein said lugs further include crisscrossed grooves in a raised surface.

15. An all-terrain track assembly comprising:
    a) a track framework including a plurality of idler wheels and a drive drum;
    b) a drive track trained about said idler wheels and said drive drum;
    c) tensioner means for adjusting the tension of said drive track at said framework; and d) anti-torque means adapted to be attached to a vehicle for biasing said framework to an equilibrium position and comprising an eccentric frame member which mounts to said vehicle and a collar having a bore which includes a resilient surface that mates to said eccentric frame member to resist rotation of said eccentric frame member within said bore, whereby the track is prevented from contacting the vehicle.

16. An all-terrain track assembly comprising:

a) a track framework including a plurality of idler wheels and a drive drum;

b) a drive track trained about said idler wheels and said drive drum and having a plurality of raised lugs which mesh with said drive drum; and c) anti-torque means adapted to couple said framework to a vehicle for resisting rotation of said track framework between a first limit and an equilibrium position and biasing said framework to said equilibrium position, wherein a frame member mounts within the bore of a collar containing compression means that mate to said frame member to resist rotation of said frame member within said bore, whereby said drive track is prevented from contacting the vehicle.

17. Apparatus as set forth in claim 16 including means for adjusting the tension of said drive track.

* * * * *